United States Patent [19]

Mueller et al.

[11] Patent Number: 4,641,533
[45] Date of Patent: Feb. 10, 1987

[54] PRESSURE MEASURING APPARATUS

[75] Inventors: Fritz Mueller, Ingelfingen-Criesbach; Lothar Pienta, Ingelfingen, both of Fed. Rep. of Germany

[73] Assignee: Gebrueder Mueller Apparatebau GmbH & Co. KG, Ingelfingen-Criesbach, Fed. Rep. of Germany

[21] Appl. No.: 800,542

[22] Filed: Nov. 21, 1985

[30] Foreign Application Priority Data

Nov. 22, 1984 [DE] Fed. Rep. of Germany ....... 3442624

[51] Int. Cl.4 .............................. G01L 7/04; G01L 7/08
[52] U.S. Cl. ........................................ 73/706; 73/715; 73/732; 73/741; 73/756
[58] Field of Search ................. 73/300, 706, 732, 733, 73/734, 735, 736, 737, 738, 739, 740, 741, 742, 743, 756, 431

[56] References Cited

U.S. PATENT DOCUMENTS

| | | | |
|---|---|---|---|
| 2,216,374 | 10/1940 | Martin | 73/706 |
| 3,712,138 | 1/1973 | Alinari | 73/300 |
| 4,111,056 | 9/1978 | Mastromatteo | 73/706 |
| 4,192,192 | 3/1980 | Schnell | 73/706 |

Primary Examiner—Donald O. Woodiel
Attorney, Agent, or Firm—Henry M. Feiereisen

[57] ABSTRACT

A pressure measuring apparatus especially of aggressive fluids includes a manometer whose casing accommodates a diaphragm separating a first chamber within the casing from a second chamber within the casing. The first chamber contains a neutral fluid which transfers the pressure of the aggressive fluid provided in the second chamber and exerting a pressure onto the diaphragm to a mechanical indicator of the manometer for indicating the measured pressure.

6 Claims, 1 Drawing Figure

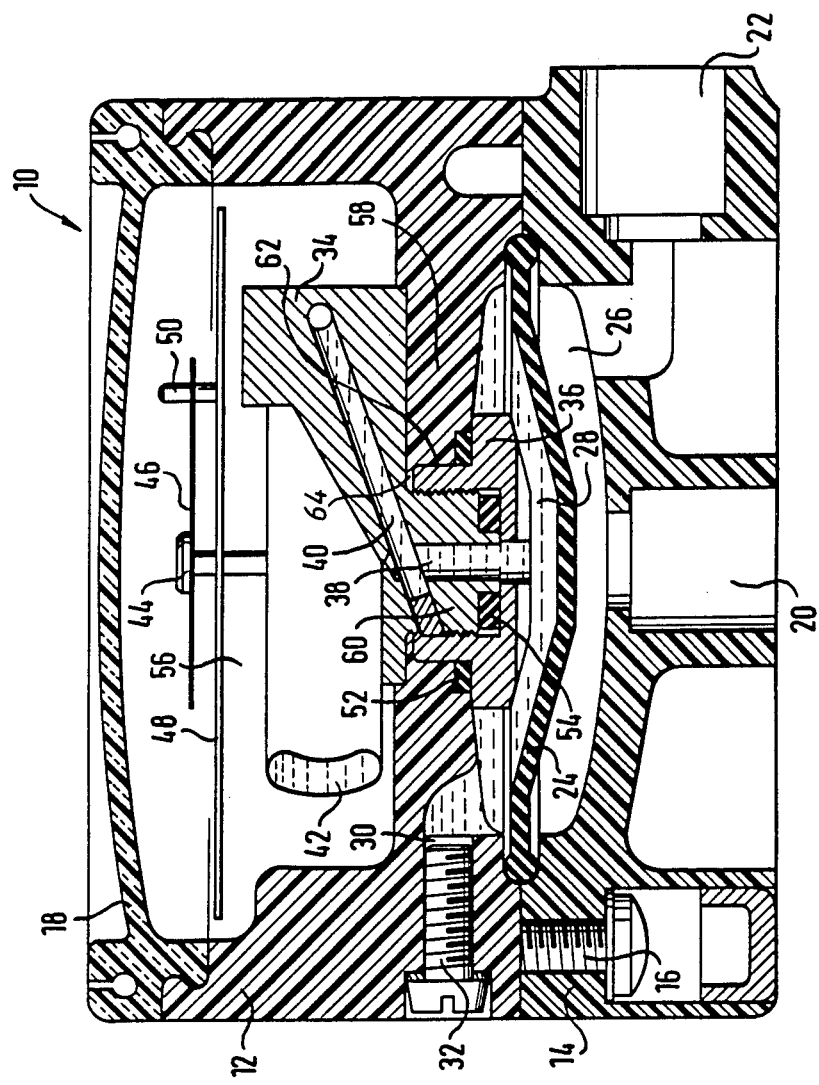

PRESSURE MEASURING APPARATUS

FIELD OF THE INVENTION

The present invention refers to an apparatus for measuring the pressure especially of aggressive fluids.

BACKGROUND OF THE INVENTION

Upon measuring the pressure of aggressive fluids, a manometer is used which cooperates with a diaphragm device so as to be protected from these aggressive fluids. The diaphragm device constitutes a separate unit which is connected to the aggressive fluids, on the one hand, and to the manometer, on the other hand, and incorporates a diaphragm separating the manometer from the fluid. Consequently, the pressure exerted by the aggressive fluid on one side of the diaphragm is transmitted to the manometer by means of an intermediate neutral fluid provided at the other side of the diaphragm.

Since such a pressure measuring apparatus employs a separate diaphragm device, the entire unit i.e. diaphragm device and manometer is of considerable size, thus requiring a considerable amount of space. Moreover, the neutral transfer fluid must be filled into the diaphragm device without any gas occlusions or vacuum occlusions. During connection of the diaphragm device to the manometer, these occlusions could, however, not be entirely prevented. A further disadvantage of such a prior art apparatus resides in the complexity of the pipework in case of connecting a vertical line.

OBJECT OF THE INVENTION

It is thus the principal object of the present invention to provide an improved apparatus for pressure measurement, especially of aggressive fluids, obviating the afore-stated drawbacks.

SUMMARY OF THE INVENTION

This object is realized according to the invention by providing a manometer which has a casing accommodating a diaphragm which separates a first chamber arranged within the casing and containing a transfer fluid from a second chamber within the casing and containing the fluid whose pressure is to be measured as e.g. an aggressive fluid.

The casing includes an upper casing portion and a lower casing portion between which the diaphragm is tightly clamped and which are made of plastic material. The upper casing portion includes an inwardly extending collar with a central opening in which a manometer carrier together with a retaining ring projects to seal off the first chamber from an upper space within the upper casing portion. This upper space accommodates the mechanical parts for measuring and indicating the pressure of the fluid acting on the diaphragm within the first chamber.

According to a further feature of the invention, the lower casing portion is provided with two connections for selectively coupling the manometer to a vertical or a horizontal line.

By integrating the diaphragm and the transfer fluid within the manometer, the overall height is considerably reduced. The unit is ready to be installed and can easily be connected to a horizontal or to a vertical line without any auxiliary parts like e.g. bends or angles and without modification of the indicator. A further advantage of the present invention resides in that the transfer fluid which is usually contained in the manometer provides additionally an attenuation of the mechanical indicator, a fact which is especially advantageous upon occurrence of pulsating pressures.

The manometer may further be equipped with a fitting ring which is clamped to the manometer and allows the installation of a switchboard. Moreover, the apparatus according to the invention is usable as a manometric switch in which case the indicator is substituted by a contact device.

BRIEF DESCRIPTION OF THE DRAWING

The above and other objects, features and advantages of the present invention will now be described in more detail with reference to the accompanying drawings in which:

The sole FIGURE is a cross sectional view of one embodiment of a pressure measuring apparatus according to the invention.

SPECIFIC DESCRIPTION

In the drawing, I have shown a manometer generally designated by reference numeral 10. The manometer 10 has a casing of plastic material which includes an upper casing portion 12 connected to a lower casing portion 14 via respective screws 16. Snapped on the upper casing portion 12 is a cap 18 which is made of clear, translucent plastic material. Although, a snap-on-cap has been illustrated in the FIGURE, it should be noted that certainly any other suitable fastening means can be applied to connect the cap 18 to the casing portion 12.

The lower casing portion 14 is provided with a connection 20 and a connection 22 for selectively coupling the manometer 10 to horizontal or vertical lines. Each connection 20,22 leads to a chamber 26 accommodated within the casing and completely separated from a further chamber 28 by a diaphragm 24 which is tightly clamped along its circumference between both casing portions 12,14. The diaphragm 24 can be made of a variety of materials so as to be adaptable to the used working fluid. An example of the material for the diaphragm is soft elastomer, fluorinated rubber or teflon.

As is shown in the drawing, the upper casing portion 12 is provided with a radially inwardly extending collar 58 which supports a manometer carrier 34 made of e.g. brass. The collar 58 has a central opening 62 in which an extension piece 60 of the manometer carrier 34 projects with a distance to the surrounding collar 58. Extending in the so-formed space between the piece 60 and the collar 58 is a retaining ring 36 which is connected to the extension piece 60 e.g. via respective threads. The retaining ring 36 rests against the underside of an annular prolongation 64 of the collar 58.

The chamber 28 which is defined by the diaphragm 24 and the collar 58 as well as the extension piece 60 and the retaining ring 36 communicates with a borehole 30 to allow a neutral transfer fluid to be introduced into the chamber 28. Any fluid like e.g. a suitable oil can be used for transferring the pressure as long as it does not attack the diaphragm 24 and the remaining parts of the manometer 10 contacted by the fluid and its viscosity remains constant over a wide temperature range. When the chamber 28 is filled with transfer fluid, the borehole 30 is sealed off by a screw plug 32.

Extending within the retaining ring 36 and within the manometer carrier 34 is an axial channel 38 which communicates at its one end with the chamber 28 and is connected with its other end to an inclined channel 40 arranged within the manometer carrier 34. The inclined channel 40 is in communication with a Bourdon tube 42 which is linked to a mechanical indicator including a pin 44 connected to the Bourdon tube 42 and supporting a pointer 46 which moves over a scale 48 to indicate the sensed pressure. Erected vertically from the scale 48 is a stop pin 50 for limiting the deflection of the pointer 46.

As is shown in the FIGURE, the mechanical parts of the manometer for indicating the pressure that is Bourdon tube 42, pin 44, pointer 46, scale 48 and stop pin 50 are accommodated in a space 56 which is sealed against the chamber 28 by means of a gasket 52 inserted in a respective annular groove of the collar 58 and a further gasket 54 positioned in a groove of the extension piece 60.

After having described the individual parts of the apparatus according to the invention, its mode of operation will now be explained in more detail.

The screw plug 32 is removed from the borehole 30 so that the transfer fluid can be introduced into the chamber 28 until the latter as well as the channels 38 and 40 and the Bourdon tube 42 are completely filled without the occurrence of gas occlusions or vacuum occlusions. Subsequently, the borehole 30 is sealed by the screw plug 32. Except for the space 56, the entire internal space of the manometer 10 above the diaphragm 24 is thus filled with the transfer fluid.

The aggressive fluid flowing selectively through either of the connections 20 or 22 into the chamber 26 exerts a certain pressure onto the diaphragm 24 which becomes deformed and transmits the pressure of the aggressive fluid onto the transfer fluid within the chamber 28 and eventually via the channels 38 and 40 to the Bourdon tube 42. Depending on the pressure of the aggressive fluid, the Bourdon tube 42 in a manner known per se rotates the pin 44 so that the pointer 46 is moved over the scale 48 to indicate the measured pressure.

When the diaphragm 24 is relieved from the pressure of the aggressive fluid, the Bourdon tube 42 as well as the diaphragm 24 return into their initial position.

Although not shown in detail in the FIGURE, it may be desirable to use two adjustable pointers which move over the scale 48 to indicate to the operator e.g. a minimum pressure and a maximum pressure.

While the invention has been illustrated and described as embodied in a Pressure Measuring Apparatus, it is not intended to be limited to the details shown since various modifications and structural changes may be made without departing in any way from the spirit of the present invention.

What is claimed as new and desired to be protected by Letters Patent is set forth in the appended claims:

1. Apparatus for measuring the pressure of a fluid; comprising:
    a manometer having a casing;
    diaphragm means for transmitting the pressure of the fluid to said manometer, said diaphragm means being directly incorporated within said casing of said manometer and forming with the latter an integrated unit wherein said diaphragm means includes a diaphragm separating a first chamber in said casing from a second chamber, said first chamber being filled with a transfer fluid and said second chamber containing the fluid whose pressure is to be measured, said casing including an upper casing portion and a lower casing portion connected to each other, said diaphragm having a circumference clamped between said upper and lower casing portions;
    measuring means accommodated within said upper casing portion, said casing being completely filled with said transfer fluid above said diaphragm up to said measuring means wherein said upper casing portion is provided with an radially inwardly extending collar provided with a central opening and arranged above said diaphragm; and
    support means projecting into said opening to seal said first chamber from a remaining upper space within said upper casing portion, said support means including a manometer carrier having an extension piece projecting into said opening at a distance to said collar, a retaining ring connected to said extension piece to close said opening and a pair of gaskets to seal off said remaining upper space from said first chamber.

2. Apparatus as defined in claim 1, and further comprising indicating means for displaying the measured pressure, said measuring means including a Bourdon tube communicating with said first chamber for allowing a transfer of the pressure of the fluid from said first chamber to said Bourdon tube wherein said Bourdon tube actuates said indicating.

3. Apparatus as defined in claim 2 wherein said indicating means includes a pin coupled to said Bourdon tube and at least one pointer which moves over a scale to indicate the measured pressure of the fluid.

4. Apparatus as defined in claim 1 wherein said retaining ring is provided with an axial borehole and said manometer carrier is provided with a further axial borehole in prolongation of said first mentioned axial borehole so as to define an axial channel in communication with said first chamber, said manometer carrier accommodating an inclined channel connected to said axial channel at its end remote to said first chamber and communicating with said Bourdon tube, said transfer fluid transmitting the pressure of the fluid from said first chamber via said axial channel and inclined channel to said Bourdon tube.

5. Apparatus as defined in claim 1 wherein said casing is made of plastic material.

6. Apparatus as defined in claim 1, and further comprising connection means for coupling said manometer to horizontal and vertical lines.

* * * * *